No. 828,604. PATENTED AUG. 14, 1906.
W. H. HOYT.
PROCESS FOR PRODUCING FLAT MOLDED SOUND RECORDS.
APPLICATION FILED JUNE 9, 1903.
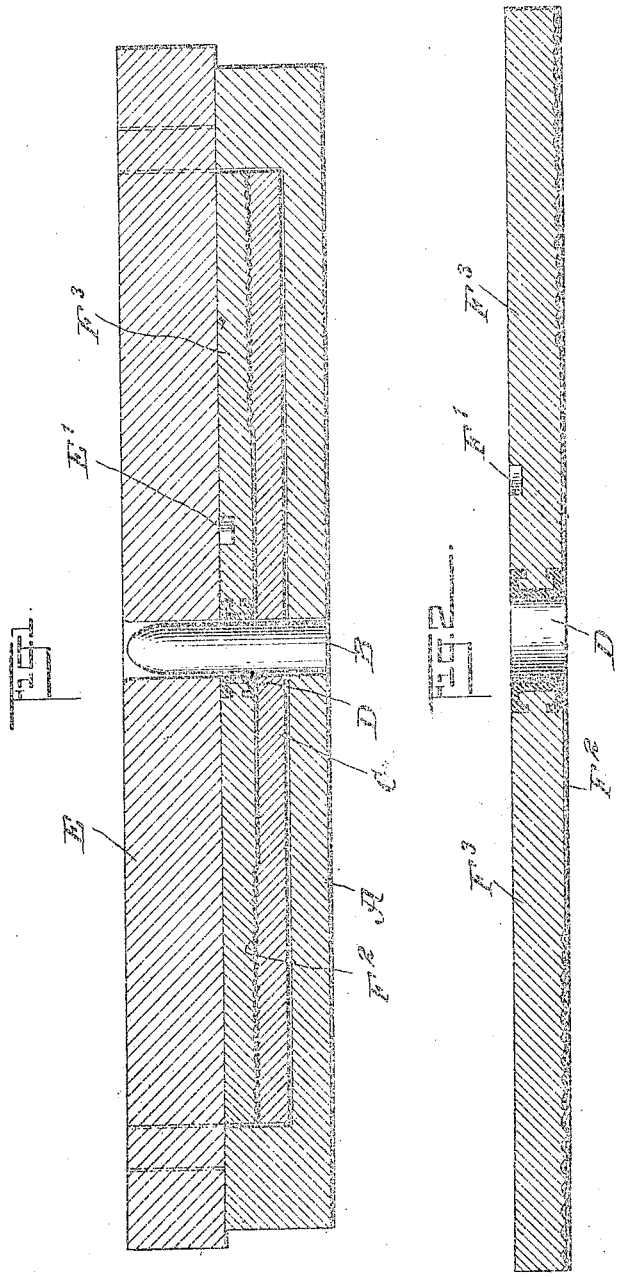
INVENTOR
William H. Hoyt
BY
his ATTORNEYS

UNITED STATES PATENT OFFICE.

WILLIAM H. HOYT, OF WYOMING, NEW JERSEY.

PROCESS FOR PRODUCING FLAT-MOLDED SOUND-RECORDS.

No. 828,604.      Specification of Letters Patent.      Patented Aug. 14, 1906.

Application filed June 9, 1903. Serial No. 160,733.

*To all whom it may concern:*

Be it known that I, WILLIAM H. HOYT, a citizen of the United States, and a resident of Wyoming, in the county of Essex and State of New Jersey, have invented certain new and useful Improvements in Processes for Producing Flat-Molded Sound-Records, of which the following is a specification.

My invention relates to the manufacture of molded disk records, such as are used for some talking-machines.

The object of my invention is to provide an improved process of producing such records, whereby they will be given great strength and durability.

In the accompanying drawings I have illustrated an apparatus such as may be used in producing a talking-machine record according to my invention, Figure 1 being a sectional elevation of such apparatus with the record in process of formation, and Fig. 2 is a cross-section of the completed article.

The apparatus, for which I do not claim any novelty in the present application, consists of a body A, provided with a pin B for centering the matrix-disk C and the bushing D, which I prefer to employ as a lining at the central aperture of the record. The pin B also forms a guide for the pressure-plate E, which is adapted to engage the upper surface of the record in process of molding same.

E' is a pin for producing the customary eccentric recesses F' in the record F.

Hitherto it has been customary to make the record from a homogeneous plastic composition, which was molded by being pressed into the irregularities upon the upper surface of the matrix C. According to my present invention after preparing a suitable plastic mixture and putting the same in a viscid or molten condition into a heated mold on top of the matrix disk C, as indicated at $F^2$, I superimpose a backing of suitable material—such as linen, cardboard, or papier-mâché board—and then put this mold and the contents in a hydraulic or other press to force the top plate E against the material for the record. The composition or plastic mass should form only a comparatively thin layer, the thickness of the backing being much greater than that of the composition, which therefore forms a covering or lining for the backing. By this procedure I secure an impression of the irregularities of the matrix not only into the lining or facing $F^2$, but into the adjacent portion of the backing $F^3$ as well. This is shown with particular clearness in Fig. 2. The connection of the facing with the backing is thus rendered very strong, inasmuch as the said elements are provided with interlocking projections.

The article resulting from the above-described process can be made considerably thinner than a record made exclusively from plastic composition and is much lighter in weight, stronger, and more durable than similar articles as produced hitherto.

While pressure is being applied to mold the article I also cool the plastic mass, as by water circulation, so as to bring about a rapid hardening and solidification of the mass.

I claim as my invention—

1. The herein-described process of producing flat-molded sound-records, which consists in interposing a thin, substantially plane plastic facing between a yielding, less plastic backing and a substantially flat record-matrix, and exerting pressure so as to impress the irregularities of the matrix not only into the facing, but into the adjacent portion of the backing.

2. The herein-described process of producing flat-molded sound-records, which consists in interposing, under the application of heat, a thin substantially plane plastic facing between a flat record-matrix and a yielding, less plastic backing of materially greater thickness than said facing, and then applying a cooling influence to cause the facing to harden, and at the same time pressure to cause the irregularities of the matrix to impress themselves into the facing and into the adjacent portions of the backing.

3. The herein-described process of producing flat-molded sound-records, which consists in applying a thin, substantially plane plastic facing on top of a flat record-matrix, then applying a yielding, non-brittle and less plastic backing on top of said facing, applying a downward pressure to the backing so as to cause the facing to conform to the irregularities of the matrix, and the rear surface of the facing, under the influence of said irregularities of the matrix, to assume irregularities which are impressed into the face of said backing, and then solidifying the facing and removing the pressure.

In testimony whereof I have signed my name to this specification in the presence of two subscribing witnesses.

WILLIAM H. HOYT.

Witnesses:
FREDK. H. BECKWITH,
MOSS. ED. JACKSON.